(12) United States Patent
Chopra et al.

(10) Patent No.: US 10,095,588 B1
(45) Date of Patent: *Oct. 9, 2018

(54) BACKUP USING INSTINCTIVE PREFERRED SERVER ORDER LIST (PSOL)

(71) Applicant: EMC IP Holding Company LLC, Hopkinton, MA (US)

(72) Inventors: Shelesh Chopra, Bangalore (IN); Shoukathali Chandrakandi, Kannur (IN); Gajendran Raghunathan, Bangalore (IN); Sainath Gonugunta, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/495,807

(22) Filed: Apr. 24, 2017

Related U.S. Application Data

(63) Continuation of application No. 14/326,288, filed on Jul. 8, 2014, now Pat. No. 9,672,116.

(51) Int. Cl.
G06F 17/30 (2006.01)
G06F 11/14 (2006.01)

(52) U.S. Cl.
CPC .... *G06F 11/1464* (2013.01); *G06F 17/30377* (2013.01); *G06F 2201/80* (2013.01)

(58) Field of Classification Search
CPC .......... G06F 11/1464; G06F 17/30088; G06F 11/451; G06F 17/30575
USPC ....... 707/770, 640, 769, 704, 649, 650, 652, 707/653; 709/203, 226, 222; 714/4.1, 714/47.3
See application file for complete search history.

(56) References Cited

U.S. PATENT DOCUMENTS

| | | | |
|---|---|---|---|
| 5,493,689 A | 2/1996 | Waclawsky |
| 5,606,693 A | 2/1997 | Nilsen |
| 5,668,986 A | 9/1997 | Nilsen |
| 6,298,451 B1 | 10/2001 | Lin |
| 6,421,317 B1 | 7/2002 | Denecheau |
| 6,665,812 B1 | 12/2003 | Blumenau |
| 6,826,711 B2 | 11/2004 | Moulton |
| 7,263,529 B2 | 8/2007 | Cordery |

(Continued)

FOREIGN PATENT DOCUMENTS

EP 2677721 12/2013

OTHER PUBLICATIONS

U.S. Appl. No. 14/326,288, filed Jul. 8, 2014, Shelesh Chopra, et al.

(Continued)

*Primary Examiner* — Frantz Coby
(74) *Attorney, Agent, or Firm* — Workman Nydegger

(57) ABSTRACT

In one example, a method for data backup includes surveying a database availability group (DAG) that includes multiple nodes which are each associated with one or more databases, to determine a distribution of the databases across the nodes. Next, federated logic is used to create a profile of the DAG based on the survey, and the profile is used to generate a dynamic preferred server order list (PSOL). Load balancing for the DAG is performed using the dynamic PSOL, and the dynamic PSOL is updated based on results of the load balancing. Finally, a federated backup of the databases is performed based on the updated dynamic PSOL.

20 Claims, 5 Drawing Sheets

(56) References Cited

U.S. PATENT DOCUMENTS

| | | | |
|---|---|---|---|
| 7,302,450 | B2 | 11/2007 | Benedetti |
| 7,346,686 | B2 | 3/2008 | Albert |
| 7,383,247 | B2 * | 6/2008 | Li .................... G06F 17/30967 |
| 7,539,710 | B1 * | 5/2009 | Haustein ............ G06F 11/1453 |
| 7,664,847 | B2 | 2/2010 | Colrain |
| 8,156,502 | B1 | 4/2012 | Blanding |
| 8,209,696 | B2 | 6/2012 | Ferguson |
| 8,375,396 | B2 | 2/2013 | Pooni |
| 8,443,367 | B1 * | 5/2013 | Taylor ...................... G06F 9/52 |
| | | | 718/1 |
| 8,458,210 | B2 | 6/2013 | Arifuddin |
| 8,695,012 | B2 | 4/2014 | Kanso |
| 8,782,256 | B2 | 7/2014 | Dec |
| 8,965,921 | B2 | 2/2015 | Gajic |
| 8,972,326 | B2 | 3/2015 | Prathaban |
| 9,141,435 | B2 | 9/2015 | Wein |
| 9,172,750 | B2 | 10/2015 | Bulkowski |
| 9,483,485 | B1 * | 11/2016 | Chockalingam ........ G06F 11/14 |
| 9,489,270 | B2 | 11/2016 | Anglin |
| 9,672,116 | B1 * | 6/2017 | Chopra ............... G06F 11/1464 |
| 2004/0186844 | A1 | 9/2004 | Muhlestein |
| 2005/0033818 | A1 | 2/2005 | Jardin |
| 2006/0031268 | A1 * | 2/2006 | Shutt ................. G06F 17/30584 |
| 2006/0136448 | A1 * | 6/2006 | Cialini .............. G06F 17/30306 |
| 2010/0162260 | A1 * | 6/2010 | Ibrahim .................. G06F 9/505 |
| | | | 718/105 |
| 2010/0199350 | A1 * | 8/2010 | Lilibridge ............. G06F 9/4843 |
| | | | 726/24 |
| 2011/0162038 | A1 * | 6/2011 | Chunilal ........... G06F 17/30867 |
| | | | 726/1 |
| 2012/0117028 | A1 | 5/2012 | Gold |
| 2012/0158664 | A1 * | 6/2012 | Anglin ................ G06F 11/1469 |
| | | | 707/675 |
| 2013/0031136 | A1 * | 1/2013 | Shah ................. G06F 17/30528 |
| | | | 707/783 |
| 2013/0227100 | A1 * | 8/2013 | Dobies ................ H04L 67/1095 |
| | | | 709/223 |
| 2014/0211698 | A1 | 7/2014 | Aguirre |
| 2014/0280961 | A1 * | 9/2014 | Martinez ............. H04L 41/5054 |
| | | | 709/226 |
| 2014/0297611 | A1 | 10/2014 | Abbour |
| 2014/0304412 | A1 | 10/2014 | Prakash |
| 2015/0286519 | A1 | 10/2015 | Huang |

OTHER PUBLICATIONS

EMC Backup, Recovery & Archive Solutions; Defenders of the Virtual World; Don Fautt EMC Corporation Backup Recovery Systems Division; Thursday, Jun. 7, 2012; pp. 1-59.

EMC® NetWorker® Module for Microsoft for Exchange Server VSS Release 8.2 User Guide; P/N 302-000-654 REV 01; 2007; pp. 1-150.

U.S. Appl. No. 14/326,288, Jul. 20, 2016, Office Action.

U.S. Appl. No. 14/326,288, Jan. 31, 2017, Notice of Allowance.

* cited by examiner

US 10,095,588 B1

BACKUP USING INSTINCTIVE PREFERRED SERVER ORDER LIST (PSOL)

RELATED APPLICATIONS

This application is a continuation, and hereby claims the benefit, of U.S. patent application Ser. No. 14/326,288, entitled BACKUP USING INSTINCTIVE PREFERRED SERVER ORDER LIST (PSOL), and filed Jul. 8, 2014. All of the aforementioned applications are incorporated herein in their respective entireties by this reference.

FIELD OF THE INVENTION

Embodiments of the present invention generally concern backing up data. More particularly, embodiments of the invention relate to systems, hardware, computer-readable media, and methods for performing federated backups.

BACKGROUND

Entities often generate and use data that is important in some way to their operations. This data can include, for example, business data, financial data, and personnel data. If this data were lost or compromised, the entity may realize significant adverse financial and other consequences. Accordingly, many entities have chosen to back up some or all of their data so that in the event of a natural disaster, unauthorized access, or other events, the entity can recover any data that was compromised or lost, and then restore that data to one or more locations, machines, and/or environments.

Systems, hardware, computer-readable media, and methods for performing federated backups have proven useful in environments where it is desired to back up all databases in a defined group using a single save set for all the nodes in that group. Nonetheless, there remain some unmet needs where federated backups are concerned.

One example of shortcomings in the area of federated backups relates to the priorities set forth in a preferred server order list (PSOL) that specifies database copies eligible to be used for the federated backup, and the effect of those priorities relative to the active and passive databases residing on the various nodes. For example, depending upon the number of nodes in a group, and the number of databases distributed across those nodes, implementation of PSOL priorities can give rise to circumstances where fewer than all the nodes in the group are utilized for storage of the database backups. In such circumstances then, the backup workload is not efficiently distributed among the nodes of the group.

A related problem is that because the backup effort is concentrated at a subset of the total number of nodes in the group, the backup process will take relatively longer than if all the nodes in the group were utilized for the backup process. While manual rescheduling of the backup process may help to distribute the backup workload more efficiently, configuring and implementing a manual rescheduling process is time consuming and thus increases the amount of time required to complete the backup process.

A further problem concerns the fact that federated backups may rely on manual definition, such as by an administrator or other user, of the PSOL. However, the use of a manually generated PSOL is problematic because, once defined, it cannot easily be modified in response to changes in conditions that may occur during a backup procedure. To illustrate, if a failover or other problem should occur during the backup process that renders one of the nodes inaccessible or non-functional, no mechanism is provided to account for this change in conditions, and the user would have to manually reconfigure the PSOL in response to changing conditions in the group containing the nodes where the databases reside. This manual reconfiguration interrupts and slows down the backup process, thus reducing availability of databases and/or nodes in the group.

In light of the foregoing, it would be helpful to be able to be able to balance a backup workload amongst the nodes in a group such as a database availability group (DAG). Likewise, it would be useful to be able to reconfigure a PSOL automatically in response to the occurrence of one or more events affecting an associated backup process.

BRIEF DESCRIPTION OF THE DRAWINGS

In order to describe the manner in which aspects of at least some embodiments of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
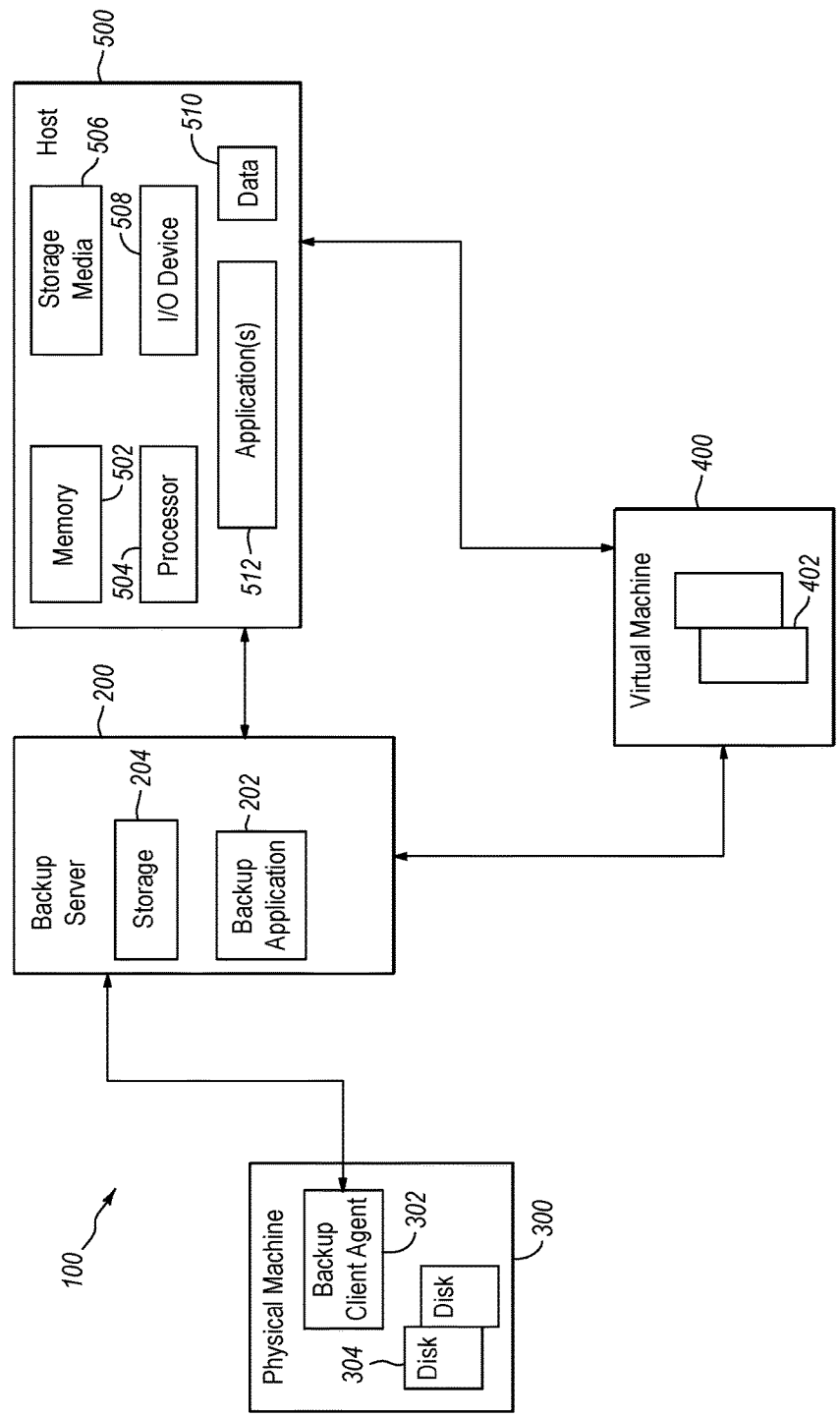
FIG. 1 discloses aspects of an example operating environment for at least some embodiments.

Embodiments of the present invention generally concern backing up data. More particular example embodiments of the invention relate to systems, hardware, computer-readable media and methods for performing backups using federated logic that has access to a dynamically configurable preferred server order list (PSOL).

In at least some embodiments, a PSOL can be configured to enable efficient, or at least relatively more efficient, distribution of a backup workload in an environment. As well, the PSOL can be implemented in such a way that it can be dynamically and automatically reconfigured, with little or no manual intervention, in response to changes in the configuration and/or conditions of the environment in which it is employed. In some embodiments, the PSOL is implemented as an element of a backup application, although that is not required.

The PSOL can be dynamically defined and/or modified by a backup application, whether or not the PSOL is an element of the backup application. Some example parameters that can form the basis for definition and/or modification of the PSOL include, but are not limited to, any one or more of the identity of the node with maximum ownership of databases that are desired to be backed up, last activation preference information, failover preferences, the number of nodes in a group, the number of databases distributed across those nodes, and the identification of the databases that are active and those that are passive. The foregoing are presented by way of example and additional, or alternative, parameters may be employed in the definition and/or modification of the PSOL.

Further, the PSOL can be used in combination with one or more other parameters to form the basis for one or more backup operations. Such other parameters include, but are not limited to, any one or more of the status designation of a database as preferred passive, passive, or active.

In general, embodiments of the invention can generally be employed in any computing environment that includes a plurality of databases distributed across a plurality of nodes, such as servers for example. At least some particular embodiments are employed in connection with a database availability group (DAG), although that is not necessarily required. Moreover, one or more of the databases to be backed up may be a Microsoft Exchange® database, although that is not required and embodiments of the invention can, more generally, be employed with any database that is desired to be backed up.

As well, embodiments of the invention can be employed in connection with any of a variety of different backup processes. In some particular embodiments, and as suggested by the foregoing, the PSOL is particularly well suited for use in connection with a federated backup process in which a plurality of databases across a plurality of nodes are used to create a single save set that spans all of the nodes. That is, because multiple copies of a given database can be distributed across the nodes, there is no need to back up each copy of that database, and the backup of a single copy is typically adequate. The databases to be backed up can be passive databases, active databases, or a combination of passive and active databases.

As may be evident from the preceding discussion, and other disclosure herein, embodiments of the invention may provide various advantages, although it is not necessary, or required, that any particular embodiment(s) provide any particular advantage(s). Moreover, and consistent with the foregoing, embodiments within the scope of one or more claims may additionally, or alternatively, provide one or more advantages not specifically enumerated herein. Finally, to the extent that possible advantages are enumerated herein, those may be present in one or more embodiments in any combination.

At least some embodiments of the invention may be particularly useful in connection with federated backup operations. As well, backup processes can use a PSOL that can be dynamically reconfigured, without substantial manual intervention, to respond to changing conditions and/or configurations in a computing environment where a backup is performed. Finally, embodiments of the invention can enable relatively more efficient use of computing system resources when backup processes are performed.

A. Example Operating Environments

In general, embodiments of the invention can be implemented in computing environments that include a plurality of nodes and a backup server configured to communicate with the nodes. The nodes in the computing environment may each be associated, and operate in connection, with a respective plurality of databases. In some particular embodiments, the computing environment includes a DAG having a plurality of nodes. One or more of the nodes may be a server, such as a Microsoft Exchange® server for example, and each of the nodes may communicate with the backup server to back up data associated with that node.

As the nodes may each operate autonomously, and in connection with different respective databases or sets of databases, federated backup and restore applications and methods are employed in various embodiments. In general, a federated approach to database management involves the mapping of a plurality of different databases, such as the respective databases of the nodes for example, into a single federated database, which can be virtual, although that is not required. The federated database is accessible to all the nodes in the computing environment, and enables each node to have access to all data of the other nodes, without disturbing the integrity of each individual database. In at least some instances, the federated database may reside at, or be accessible by way of, the backup server.

One or more applications may be hosted by one or more of the nodes of the computing environment, and these applications may generate and/or cause the generation of data, such as electronic mail for example, that is desired to be backed up for later restoration, if necessary. Additional, or alternative, types of data to be backed up include, but are not limited to, any one or more of application data, system and other files, operating systems, file directories, and objects.

As well, the backup server includes a backup application that operates in conjunction with respective backup client agents residing on each node that stores data which is desired to be backed up and later restored to one or more target machines. The backup application includes, or operates in connection with, federated logic and a PSOL to perform a federated backup of data associated with one or more of the nodes. In some particular embodiments, the backup application may be the Network Module for Microsoft (NMM), a Microsoft-specific EMC NetWorker (NW) application that can be used for backup and restoration processes. However, the scope of the invention is not limited to the use or implementation of either NetWorker or NMM.

With the foregoing in mind, attention is directed now to FIG. 1 which discloses one example of an operating environment that may be suitable for one or more embodiments of the invention. In FIG. 1, the example operating environment is denoted at 100 and may be a network such as a local area network, a wide area network, or any other networked configuration. Moreover, the operating environment 100, or any group of one or more of its elements, may comprise, form an element of, or constitute, a cloud computing environment. For example, one or more nodes, discussed below, may comprise elements of a cloud computing environment. The environment 100 may include various devices including servers and other computers that are interconnected. The operating environment 100 may employ a variety of communication media, such as hardwire, wireless, or some combination thereof. In some instances, some or all of the operating environment 100 may comprise an optical communication network.

As indicated in FIG. 1, the example environment 100 includes a backup server 200 configured for communication with one or more clients 300, and one or more target machines 400. In general, backups created in connection with the backup server 200 can be restored to the client 300 and/or the target machine 400. The backup server 200, client 300 and/or target machine 400 may be physical machines, virtual machines, or any other suitable type of device. Additionally, one or more hosts 500 may be present in the operating environment 100.

With particular reference first to the backup server 200 and the client 300, the backup server 200 generally operates to create, or cause the creation of, one or more backups of data that is resident at the client 300. In some implementations, the backup server 200 is an EMC Corp. AVAMAR server or NetWorker server, although the scope of the invention is not limited to those example servers. The backup server 200 includes a backup application 202 that operates in conjunction with a backup client agent 302, which performs data de-duplication application in some embodiments, of the client 300 to backup data residing on storage media 304, such as disks for example, of the client 300. Further details concerning an example DAG that includes multiple clients, such as client 300 for example, are disclosed in FIG. 2. The backups cooperatively created by the backup application 202 and backup client agent 302, which comprise de-duplicated backups in some embodiments, are stored on the storage media 204 of the backup server 200. The backups may be restored to the client(s) 300 and/or to storage media 402 of the target machine 400, and/or to any other machines.

As noted above, the environment 100 may include one or more hosts 500. The number of hosts 500 in the environment 100 can vary, and the hosts can be of different types. In one example, one or more hosts 500 may all be part of the same network or associated with the same entity. The one or more hosts 500 can include, by way of example only, servers (e.g., a file server, an email server), computers (e.g., desktop computers, laptop computers, tablet devices, smartphones), virtual machines, databases, or any combination thereof. Each of the one or more hosts 500 can be associated with its own data. As well, a host 500 may generally be any device that includes one or more applications which require read-write access to a backup, such as the backups residing at the backup server 200. As such, the host 500 or any other device that requires read-write access to 'read only' data, which may or may not be backup data, may transmit both read and write requests concerning that 'read only' data.

In the example of FIG. 1, the host 500 is a machine, such as a computing device, that includes a memory 502, one or more processors 504, storage media 506, and I/O device 508, data storage 510. As well, one or more applications 512 are provided that comprise executable instructions. One or more of the target machine 400, client 300 and backup server 200 may likewise include any one or more of the aforementioned elements of example host 500, in any combination.

Figure 2:
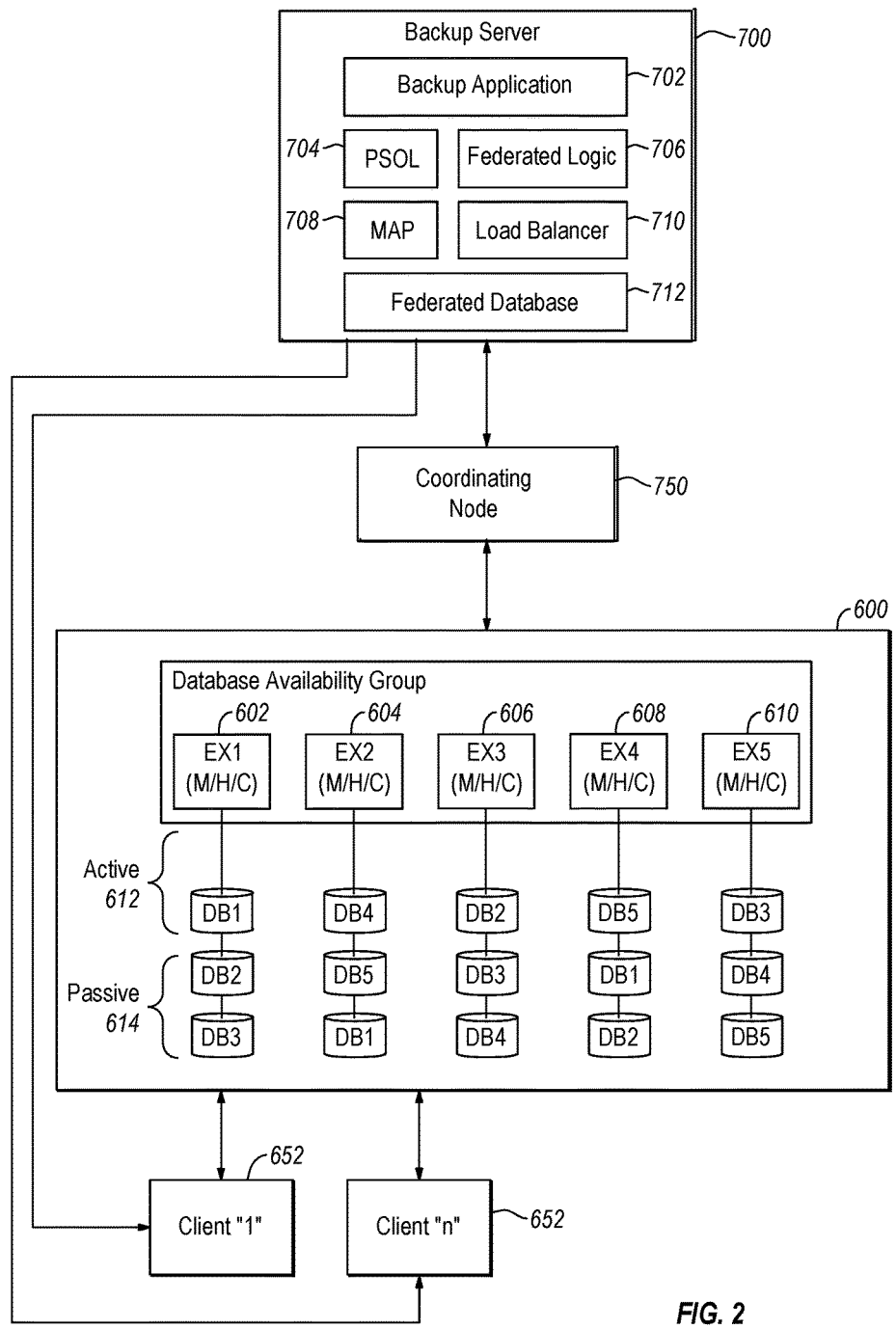
FIG. 2 discloses aspects of an example node configuration and backup server.

With continued reference to FIG. 1, and directing attention now to FIG. 2 as well, details are provided concerning a DAG 600 that include one or more members, such as the client 300 disclosed in FIG. 1, and further details are also provided concerning an example backup server 700. The example backup server 700 may take a form such as that of host 500 for example and may include any, or all, of the components of the host 500.

The example DAG 600 includes five nodes, which may collectively take the form of servers 602-610, although the nodes are not required to be servers. One of more of the servers 602-610 may be a Microsoft Exchange server as denoted by the respective notations EX1-EX5, although that is not required and the servers 602-610 may comprise any other types of server that generates, or causes the generation of, data which is desired to be backed up. A group of databases DB1-DB5 is distributed across the DAG 600, and each of the servers 602-610 operates in connection with a subset of the group of databases DB1-DB5, where the subset may be elements of the associated server, although that is not required.

In the illustrative example of FIG. 2, the DAG includes a set of active servers 612 and a set of passive servers 614. By using both active and passive databases, the DAG 600 is able to ensure a high level of availability. The designation of databases as active or passive can be changed as desired, either automatically according to a set of logical rules, or manually by a user at the backup server 700.

For example, the server 602 uses DB1, DB2 and DB3 for operations, with DB1 serving as the active database. In the example case where server 602 is a mail server, the active database is the database being used by clients 652 who have mailboxes in that database, and all transactions for DB1 are being generated by server 602. In contrast, DB2 and DB3 serve as passive databases for server 602. As such, DB2 and DB3 are not used by clients 652 and, instead, apply copies of transaction log files from the active database DB1 to the database copies at DB2 and DB3 in order to keep those database copies up to date.

In some embodiments, only passive databases are backed up, while in other embodiments active databases are backed up, and in still other embodiments, both active databases and passive databases are backed up. In at least some instances, the backup server 700, discussed below, can poll one or more of the nodes in the DAG 600 to determine which databases are passive and which databases are active.

Similar to server 602, server 604 operates in connection with active database DB4 and passive databases DB5 and DB1, server 606 operates in connection with active database DB2 and passive databases DB3 and DB4, server 608 operates in connection with active database DB5 and passive databases DB1 and DB2, and server 610 operates in connection with active database DB3 and passive databases DB4 and DB5. As in the case of server 602 and clients 652, each of the servers 604-610 serve respective groups of one or more clients (not shown).

As should be apparent, each server 602-610 operates with a different respective active database. Moreover, while a database such as DB1 may be active for one server, such as server 602 in this example, that database may serve as a passive database for one or more other servers. Thus, in this example, DB1 serves as a passive database that mirrors copies of transaction logs from active databases DB4 and DB5 of servers 604 and server 608, respectively.

With continued reference to FIG. 2, it will be appreciated that any one or more aspects of the example DAG 600 such as the number of clients served, type of nodes, number of nodes, number of databases, and distribution of databases across the nodes of the DAG 600 can be varied. Thus, the arrangement disclosed in FIG. 2 is presented solely by way of example and is not intended to limit the scope of the invention in any way.

As further indicated in FIG. 2, and discussed above in connection with FIG. 1, the operating environment may include a backup server 700 that operates in connection with a coordinating node 750 to back up the databases of the DAG 600. In some embodiments, the coordinating node 750 can be a node of the DAG 600, although that is not required. The coordinating node 750 can be user-defined, and serves to manage and monitor the backup of the DAG 600 databases.

The backup server 700 may include, for example, a backup application 702, a PSOL 704, federated logic 706, automatic PSOL selection logic 708, and a database load balancer 710. A federated database 712 may also reside at the backup server 700, or can alternatively reside in a location that is remote from the backup server 700. In general, backups of the DAG 600 databases DB1-DB5 are returned to the backup server 700 for use in creation of the federated database 712 which, in turn, can be used to restore one or more of the databases of the DAG 600 if the need arises.

Any or all of the aforementioned components of the backup server 700 can be implemented as a module, or modules. In some instances, one or more of the components of the backup server 700 can be combined. For example, the automatic PSOL selection logic 708 and database load balancer 710 together take the form of a single component in some embodiments. As another example, the PSOL 704 and/or federated logic 706 may comprise elements of the backup application 702, rather than being implemented separately as shown in FIG. 2.

Moreover, while FIG. 2 discloses various components as being combined together in the backup server 700 such that they provide for centralized control of backup processes, relative to the nodes of the DAG 600. However, the scope of the invention is not so limited. In particular, the various components and associated functionalities of the backup server 700 can be dispersed from each other in any location, or locations, that permit those components to perform the backup functionality disclosed herein. By way of example, any one or more elements, and their respective functionalities, of the backup server 700 can be located on a client, or on a node separate from the backup server 700 and DAG 600.

B. Example Functions and Functional Relations

Figure 3:
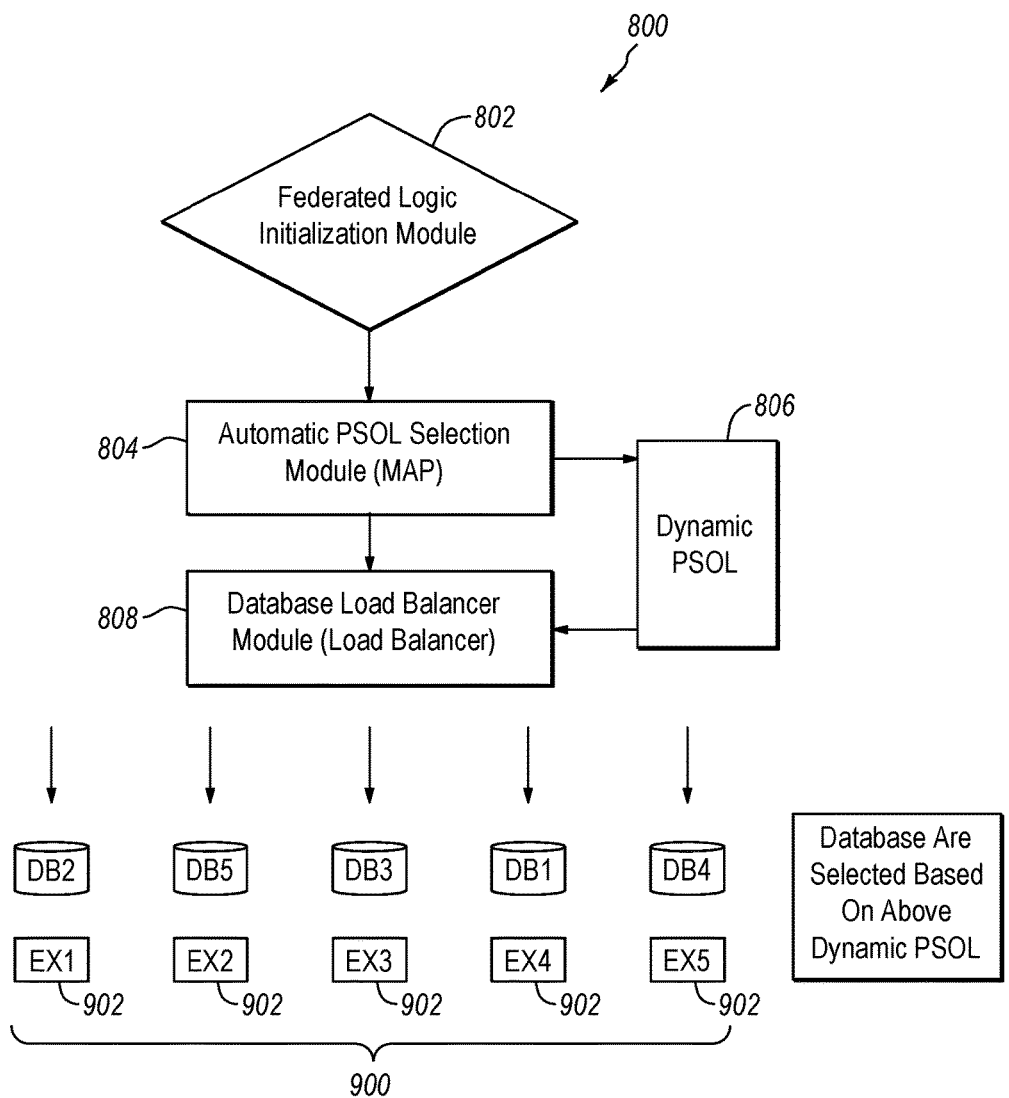
FIG. 3 discloses aspects of a functional architecture of some example embodiments.

Turning now to FIG. 3, and with continuing attention to FIGS. 1 and 2, details are provided concerning a functional architecture 800 of some example embodiments. As noted in the discussion of FIG. 1, the various functions disclosed herein can be implemented by one or more modules. The functionality and relationships disclosed in FIG. 2 may be useful in a number of ways.

For example, a PSOL can be generated that can be used to determine which database copies will be backed up by which node of a DAG. Moreover, the nature of the PSOL is such that it can be dynamically modified in response to changes in conditions and/or the configuration of the operating environment where the backup is performed, or to be performed. As another example, the information in the PSOL can be used as an input to a load balancing process that distributes the backup workload in a desired way across the various nodes of the DAG. In some instances, the backup workload is substantially evenly distributed across the nodes, although that is not required.

In general, the federated logic 802, when initialized by a user, or automatically according to a predefined schedule, serves to create a profile of the DAG 600 (reproduced in part as DAG 900 in FIG. 3, and discussed below). As explained further below, the profile information is an input to automatic PSOL selection logic 804 (MAP). Among other things, the database profile generated by the federated logic 802 may include information such as, but not limited to, the number of nodes in the DAG 600, the total number of databases, both active and passive, associated with each node 602-610, and the specific distribution of the databases across the nodes. The database profile can be stored in any suitable location including, for example, at the backup server or coordinating node (see, e.g., FIG. 2). In at least some embodiments, the federated logic 802 generates a new, or updated, database profile automatically in response to a change in conditions and/or configuration of the DAG 600. As well, the federated logic 802 can periodically examine the DAG 600 on its own initiative to identify a change in conditions and/or configuration of the DAG 600, and the federated logic 802 can then generate a new, or updated, database profile based on the examination. In some instances, this examination of the DAG 600 by the federated logic 802 can be performed periodically according to a predetermined schedule.

With continued reference to FIG. 3, the automatic PSOL selection logic 804 can use the database profile generated by federated logic 802 as part of a group of parameters that form a basis for dynamic generation of a PSOL 806. Examples of additional parameters that can be used by the automatic PSOL selection logic 804 as a basis for the generation of PSOL 806 include, but are not limited to, identity of the DAG node 602-610 that has maximum ownership of databases, last activation preference of one or more databases in the DAG, and failover preference for the databases in the DAG 600. Further details concerning these parameters are set forth below.

As noted above, one parameter that can be used as a basis for generating the PSOL 806 is the identity of the DAG 600 node with the maximum ownership of databases. This parameter refers to the node that has the most passive database copies, relative to the other nodes in the DAG 600. Because this node has the most passive database copies, there is a danger that this node could bear a disproportionate share of the backup workload unless the workload is balanced in some way. Thus, this information can then be used as an aid in balancing the backup workload that each node is required to perform for a particular backup.

As noted above, another parameter that can be considered in the generation and/or modification of the PSOL 806 is the last activation preference of one or more databases in the DAG 600. The last activation preference can be as specified by the Microsoft cluster preference, although that is not required. In general, the last activation preference parameter indicates which servers have preference over the others in terms of where that database will be in case of a disaster or a manual switchover. Thus, last activation preference refers to whichever copy of the database which can be the last one, or least preferred, to be the active database. In some environments, this information can be obtained with suitable PowerShell commands. In some embodiments, relative preferences for backup can include, from most to least preferable, preferred passive, passive, and active.

For example, in a Microsoft Exchange® environment with at least a DAG and multiple database copies, the following command can be used to obtain last activation preference information: "Get-MailboxDatabase|Sort Name|Select Name, ActivationPreference." An example of output generated in response to this command might be as follows, where the first column is the database name, and the second column indicates the activation preference for that database:

ADB1 {[MBXA1, 1], [MBXA2, 2]}
ADB2 {[MBXA1, 1], [MBXA2, 2]}
ADB3 {[MBXA1, 1], [MBXA2, 2]}
. . .
MDB1 {[MBX1, 1], [MBX2, 2], [MBX3, 3], [MBX4, 4]}
MDB2 {[MBX1, 3], [MBX2, 1], [MBX3, 2], [MBX4, 4]}
MDB3 {[MBX1, 2], [MBX2, 3], [MBX3, 1], [MBX4, 4]}.

The example output shown above indicates that database MDB1, for example, has the highest activation preference on server MBX1. Thus, MDB1 will preferably always be mounted on server MBX1. However, in case of a problem with server MBX1, Microsoft Exchange will try to mount MDB1 on server MBX2 first, then on MBX3 and, finally, on MBX4 if all previous mounting attempts failed.

In connection with the foregoing, it should be noted that the activation preference for one or more databases can be set as desired, or a previously set activation preference manually or automatically overridden. For example, in the example of a Microsoft Exchange environment, the following command can be used to set an activation preference '3' for a particular database copy DB1 on a particular node MBX2: "Set-MailboxDatabaseCopy-Identity DB1MBX2-ActivationPreference 3."

Of course, it will be appreciated that the scope of the invention is not limited to the Microsoft Exchange environment, and the foregoing are presented solely for the purposes of illustrating the more general concept of the setting and use of activation preferences.

Yet another parameter that can be that can be considered in the generation and/or modification of the PSOL 806 is the failover preference for the databases DB1-DB5 in the DAG 600. In general, each database is associated with a list of preferred owners sorted in order of preference, and the failover preference defines which node will be the preferred owner of a database if the node which initially owns the database should fail for any reason. Thus, in the event of a failover, the database is automatically moved to the next preferred node in the preferred owner list for that database. In the example of a Microsoft Exchange environment, the following command can be used to obtain the status of a particular database, namely, which node(s) can own that database in the event of a failover: "Get-ClusterOwner-Node." The particular command(s) used can vary depending upon the environment in which the DAG 600 and associated databases DB1-DB5 are operating.

Once the information concerning the input parameters has been obtained, that information can then be used by the automatic PSOL selection logic 804 to generate the PSOL 806. As noted above, those parameters may include any one or more of the database profile generated by federated logic 802, the identity of the DAG node that has maximum ownership of databases, the last activation preference of one or more databases in the DAG, and the failover preference for the databases in the DAG.

In the event that one or more of these and/or parameters should change, the PSOL 806 can be updated automatically in response. This update may occur in real time, or near real time. By way of example, if a failover should occur at a node, the failover preference(s) can be invoked and the affected database(s) moved to the next preferred node. This node change and failover information can then be used by the automatic PSOL selection logic 804 to dynamically update the PSOL 806. For example, the PSOL 806 can be updated to reflect that the failed node is no longer available to perform backup operations, and to reflect that the passive and active databases associated with the failed node have been reassigned to another node.

As noted above, the PSOL 806 can be updated automatically in response to a change in the conditions and/or structure of the operating environment. However, embodiments of the invention can additionally or alternatively enable manual updates to the PSOL 806. For example, in the event of a failover and a system failure, the automatic PSOL selection logic 804 enables a user to manually reconfigure the PSOL 806 in response to these failures.

After the PSOL 806 has been updated, the PSOL 806 logic can then be used by the load balancer logic 808 to rebalance, if necessary, the backup workload amongst the remaining available nodes in the DAG. That is, the updated PSOL 806 identifies the desired workload balance among the nodes based upon the updated information received. In general, the load balancer logic 808 can include a most preferred algorithm to perform this workload balancing/re-balancing according to the logic of the PSOL. More specifically, and with particular reference to the Microsoft Exchange example, the load balancer logic 808 can query the DAG using PowerShell queries to determine the load that has to be distributed, and the load balancer logic 808 can also back up the automatic PSOL selection logic 804 that was used to update the PSOL 806.

As a result of the balancing performed by the load balancer logic 808, DB1-DB5 can be backed up on nodes 902 (EX1-EX5) of DAG 900 as indicated in the example of FIG. 3. This balancing can be performed iteratively if necessary, in response to changing conditions. As further indicated in FIG. 3, the balancing process can help to ensure that the distribution of the database backup workload is relatively evenly distributed among the nodes available. Thus, in the particular example illustrated in FIG. 3, DB2 is backed up by node EX1, DB5 is backed up by node EX2, DB3 is backed up by node EX3, DB1 is backed up by node EX4, and DB4 is backed up by node EX5. That is, in the illustrated example, each node backs up a single corresponding database. In this regard, at least, embodiments of the invention can be advantageous relative to unbalanced backup workload situations where some nodes of a DAG might back up multiple databases, while other nodes of that DAG might not perform any backup at all.

C. Dynamic PSOL Creation and Update

Figure 4:
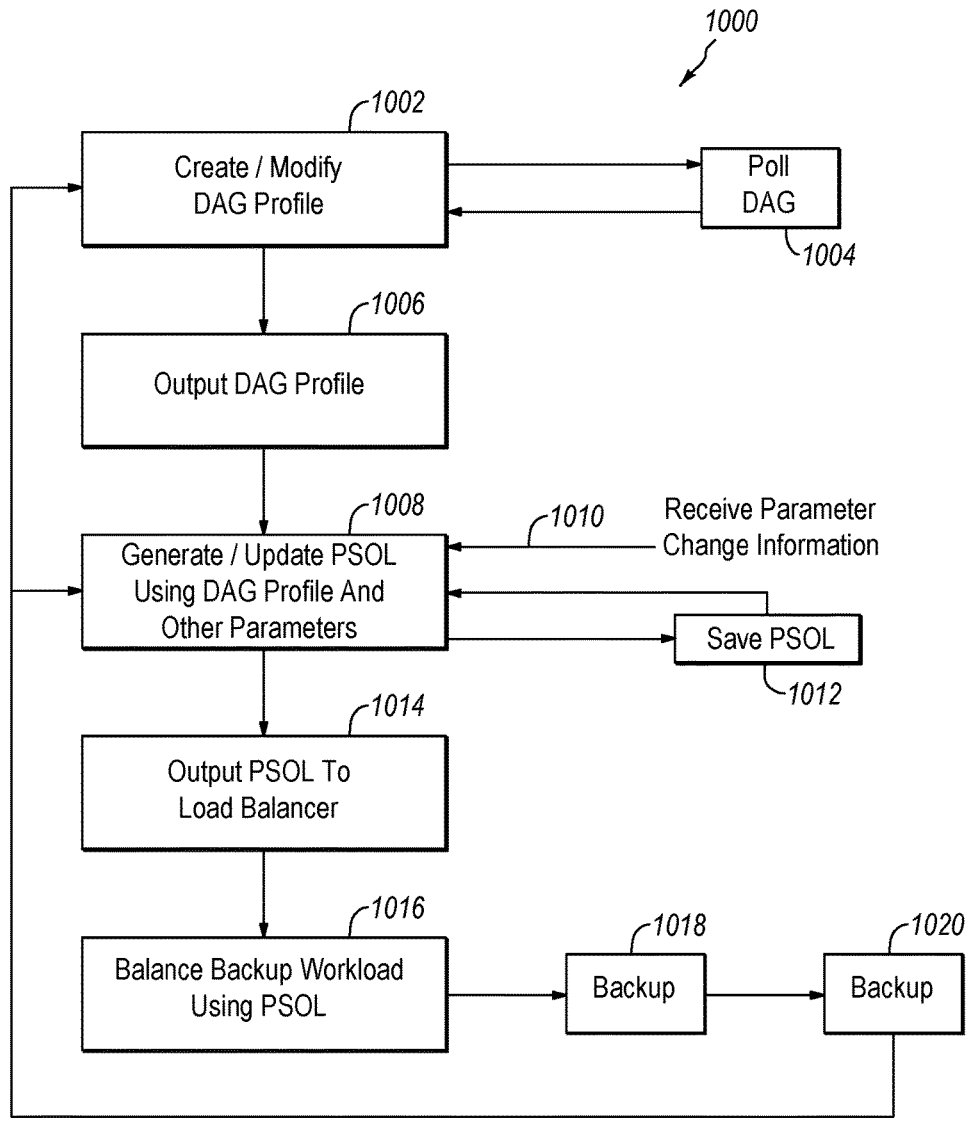
FIG. 4 is a flow diagram of an example process for creation and dynamic updating of a PSOL.

With continued reference to FIG. 3, and directing attention now to FIG. 4, details are provided concerning a method for creating and dynamically updating a PSOL. One example method is denoted at 1000. Some, or all, of the method 1000 can be performed by a backup application operating on a backup server in conjunction with one or more backup client agents on one or more nodes of a DAG. In other instances, the various processes indicated in FIG. 4 can be dispersed among a variety of nodes in the operating environment, one of which may be the backup server.

The method 1000 begins at 1002 where a DAG profile is created or modified, as applicable. In at least some instances, the DAG profile can be created or modified based upon polling 1004 of the DAG by the backup application, and receipt at the backup server of DAG information from one or more of the backup client agents of the DAG nodes.

After the DAG profile has been created 1002, the DAG profile is output 1006, such as to automatic PSOL selection logic. At 1008, a PSOL is generated, or updated, as applicable, using the PSOL and various parameters such as those discussed in connection with FIG. 3 above.

Generation and/or updating of the PSOL can be performed automatically in response to the occurrence or non-occurrence of an event, and can also be performed according to a predetermined schedule. Examples of such events include generation of a new or updated DAG profile, a change in the structure of the DAG, and a change in conditions in the DAG, such as a failover event. Before, during, or after 1008, parameter change information may be received 1010 that necessitates a change to the PSOL. After the PSOL has been generated, or updated, it can then be saved 1012.

The completed PSOL can then be output 1014, such as for use by load balancer logic. The backup workload is then balanced 1016 using the PSOL. Among other things, workload balancing can make the most efficient, or relatively more efficient, use of backup resources, namely, the nodes in the DAG. This approach, in turn, can shorten the amount of time, or the backup window, that would otherwise be required to perform the backup. Such workload balancing can include a variety of processes.

For example, as part of the balancing of the workload, consideration may be given as to which node, or nodes, own the largest number of passive database copies in the DAG. This information enables the backup application to adjust the expected backup workload balance such that part of the backup workload that would otherwise be imposed on those nodes with the largest number of passive database copies is reallocated to one or more other nodes of the DAG.

As another example, consideration may be given to failover preferences to determine the activation preferences associated with the databases of the nodes. For example, one or more of the databases selected for backup may be one with the last activation preference and, thus, the relatively lowest likelihood of becoming an active database in the event of a failover or other occurrence. This approach helps to ensure that, notwithstanding the occurrence of an event such as a failover, at least one passive copy of a particular database will still be available for backup.

After the workload has been balanced 1016 using considerations such as the foregoing considerations, the backup can then be performed 1018. Upon completion of the backup 1018, the method stops 1012, and a new process can begin when the DAG profile is updated 1002 and/or when the PSOL is updated 1008. Further details concerning an example of a backup process are disclosed in connection with FIG. 5.

D. Example Backup Process

Figure 5:
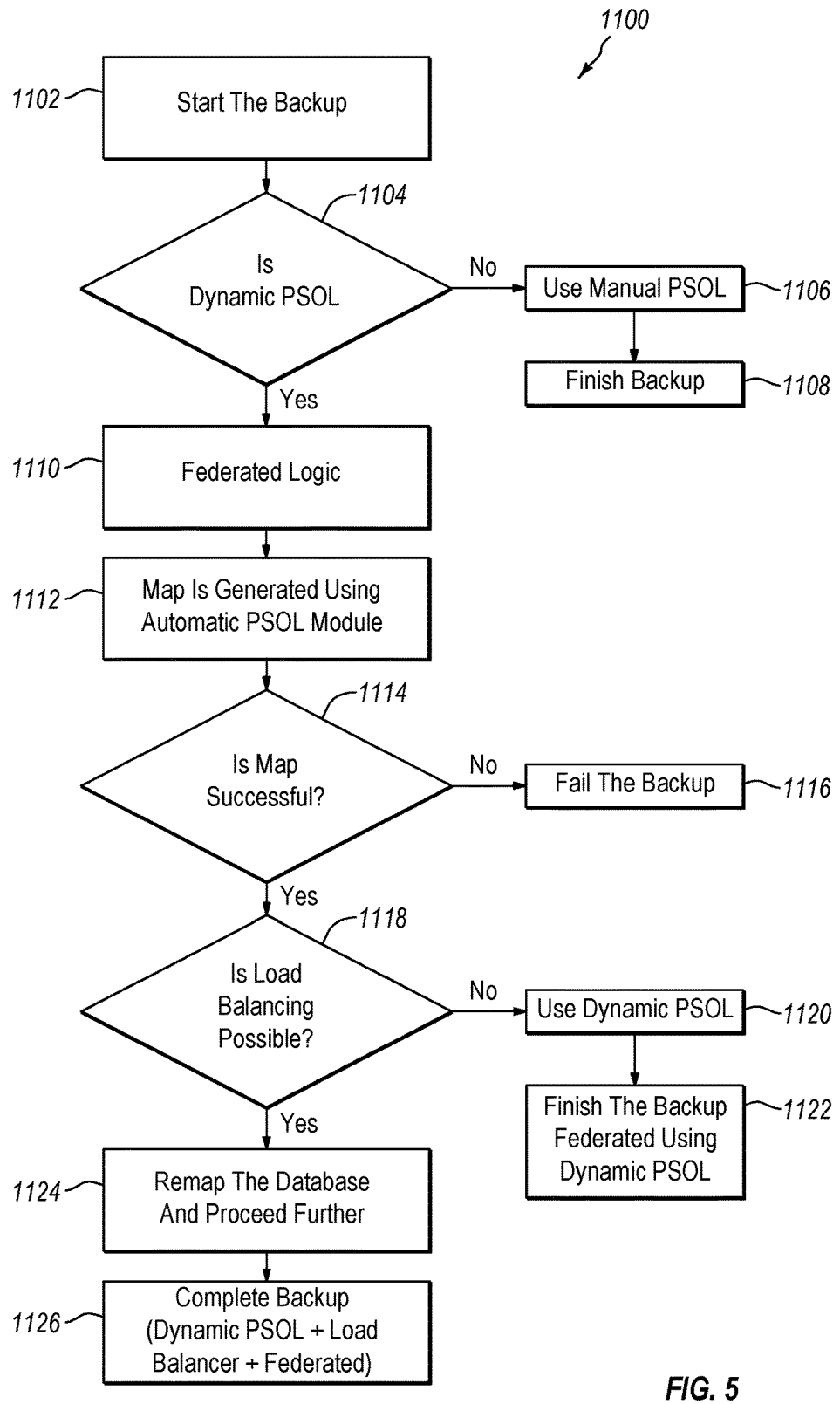
FIG. 5 is a flow diagram of an example backup process that uses a PSOL.

Directing attention finally to FIG. 5, details are provided concerning a method of performing a backup, one example of which is denoted generally at 1100. As disclosed elsewhere herein, the method 1100 can be directed to a federated backup process.

At 1102, the backup process is initialized, such as by a user accessing a backup application on a backup server, or automatically by a backup application at a backup server. After the method 1100 has started, a check 1104 is performed to determine if a dynamic PSOL is available, or will be created. If no dynamic PSOL is available or will be created, the method 1100 advances to 1106 where a manual PSOL is identified for use in performing the backup.

In general, the manual PSOL may be similar to dynamic PSOLs such as are disclosed herein, except that the manual PSOL cannot be updated in response to a change in conditions, such as a failover, nor is it necessarily the case that the manual PSOL provides for a balanced backup workload amongst the nodes of a DAG in connection with which the backup is to be performed.

After the manual PSOL has been identified 1106, the method 1100 advances to 1108 where the backup process is performed using federated logic. As a result of performance of this backup process 1108, a single saveset is created that spans all the nodes in the DAG. The saveset can take the form of a federated backup which can be stored at a backup server, although that is not required, and which can be used to restore one or more clients of the nodes of the DAG.

If, at 1104, it is determined that a dynamic PSOL is available, or will be created, for the method 1100, the method advances to 1110 where federated logic is employed to create a profile of the DAG. As disclosed elsewhere herein, this profile can include information such as, but not limited to, the number of nodes in the DAG, the total number of databases, both active and passive, associated with each node in the DAG, and the specific distribution of the databases across the nodes.

The database profile can then be used to generate 1112 a PSOL. This generation of a PSOL may be referred to here as "mapping." If 1114 the generation of a PSOL is unsuccessful for any reason, the backup is failed 1116. On the other hand, if 1114 a PSOL is successfully generated, an inquiry 1118 is then made as to whether or not backup load balancing is possible for the DAG. If load balancing is not possible, possibly because the load is already adequately balanced, then the method advances to 1120 where it is established that the PSOL will be used for the backup. The backup is then performed 1122 using the PSOL.

On the other hand, if it is determined at 1118 that load balancing is possible, perhaps because one or more nodes have been identified as owning a disproportionate share of passive database copies, then a load balancing process is performed and the PSOL is dynamically updated 1124 to reflect the rebalanced workload. After the PSOL has been updated 1124, the backup is then performed 1126 that takes into account the PSOL, including the load balancing, and database survey.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. As well, such media are examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modulates running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    surveying a database availability group (DAG) that includes a plurality of nodes which are each associated with one or more databases, to determine a distribution of the databases across the nodes;
    using federated logic to create a profile of the DAG based on the survey;
    using the profile to generate a dynamic preferred server order list (PSOL);
    performing load balancing for the DAG using the dynamic PSOL;
    updating the dynamic PSOL based on results of the load balancing; and
    performing a federated backup of the databases based on the updated dynamic PSOL.

2. The method as recited in claim 1, wherein the profile includes an identification of a node with maximum ownership of databases.

3. The method as recited in claim 1, wherein the dynamic PSOL is based on the profile, a last activation preference for one of the databases, and a failover preference for one of the databases.

4. The method as recited in claim 1, wherein one of the databases is a passive database.

5. The method as recited in claim 1, wherein the dynamic PSOL is generated without manual intervention by a user.

6. The method as recited in claim 1, wherein one of the backed up databases is associated with a node that comprises an email server.

7. The method as recited in claim 1, further comprising:
    receiving a notification of a change affecting one or more nodes and/or databases; and
    automatically updating the dynamic PSOL based upon the occurrence of the change.

8. The method as recited in claim 7, wherein the change comprises one of a failover event, a change in the PSOL, a change in the last activation preference for one of the databases, and a change in a failover preference for one of the databases.

9. The method as recited in claim 1, wherein the federated backup generates a single saveset that spans all nodes of the DAG.

10. A non-transitory storage medium having stored therein computer-executable instructions which, when executed by one or more hardware processors, implement data backup in an environment, wherein the implementation of data backup comprises performing the following processes:
    surveying a database availability group (DAG) that includes a plurality of nodes which are each associated with one or more databases, to determine a distribution of the databases across the nodes;
    using federated logic to create a profile of the DAG based on the survey;
    using the profile to generate a dynamic preferred server order list (PSOL);
    performing load balancing for the DAG using the dynamic PSOL;
    updating the dynamic PSOL based on results of the load balancing; and
    performing a federated backup of the databases based on the updated dynamic PSOL.

11. The non-transitory storage medium as recited in claim 10, wherein the profile includes an identification of a node with maximum ownership of databases.

12. The non-transitory storage medium as recited in claim 10, wherein the dynamic PSOL is based on the profile, a last activation preference for one of the databases, and a failover preference for one of the databases.

13. The non-transitory storage medium as recited in claim 10, wherein one of the databases is a passive database.

14. The non-transitory storage medium as recited in claim 10, wherein the dynamic PSOL is generated without manual intervention by a user.

15. The non-transitory storage medium as recited in claim 10, wherein one of the backed up databases is associated with a node that comprises an email server.

16. The non-transitory storage medium as recited in claim 1, wherein the processes further comprise:
    receiving a notification of a change affecting one or more nodes and/or databases; and
    automatically updating the dynamic PSOL based upon the occurrence of the change.

17. The non-transitory storage medium as recited in claim 16, wherein the change comprises one of a failover event, a change in the PSOL, a change in the last activation preference for one of the databases, and a change in a failover preference for one of the databases.

18. The non-transitory storage medium as recited in claim 10, wherein the federated backup generates a single saveset that spans all nodes of the DAG.

19. A physical backup server, wherein the physical backup server comprises:
    one or more hardware processors;
    non-transitory computer readable media; and
    computer-executable instructions stored on the non-transitory computer readable media and which, when executed by one or more of the hardware processors, implement data backup in an environment, wherein the implementation of data backup comprises performing the following processes:
        surveying a database availability group (DAG) that includes a plurality of nodes which are each associated with one or more databases, to determine a distribution of the databases across the nodes;

using federated logic to create a profile of the DAG based on the survey;

using the profile to generate a dynamic preferred server order list (PSOL);

performing load balancing for the DAG using the dynamic PSOL;

updating the dynamic PSOL based on results of the load balancing; and performing a federated backup of the databases based on the updated dynamic PSOL.

20. The physical backup server as recited in claim 19, wherein the processes further comprise:

receiving a notification of a change affecting one or more nodes and/or databases, wherein the change comprises one of a failover event, a change in the PSOL, a change in the last activation preference for one of the databases, and a change in a failover preference for one of the databases; and automatically updating the PSOL based upon the occurrence of the change.

\* \* \* \* \*